(No Model.) 2 Sheets—Sheet 1.
A. A. BOOTH.
BAND CUTTER AND FEEDER.
No. 469,907. Patented Mar. 1, 1892.
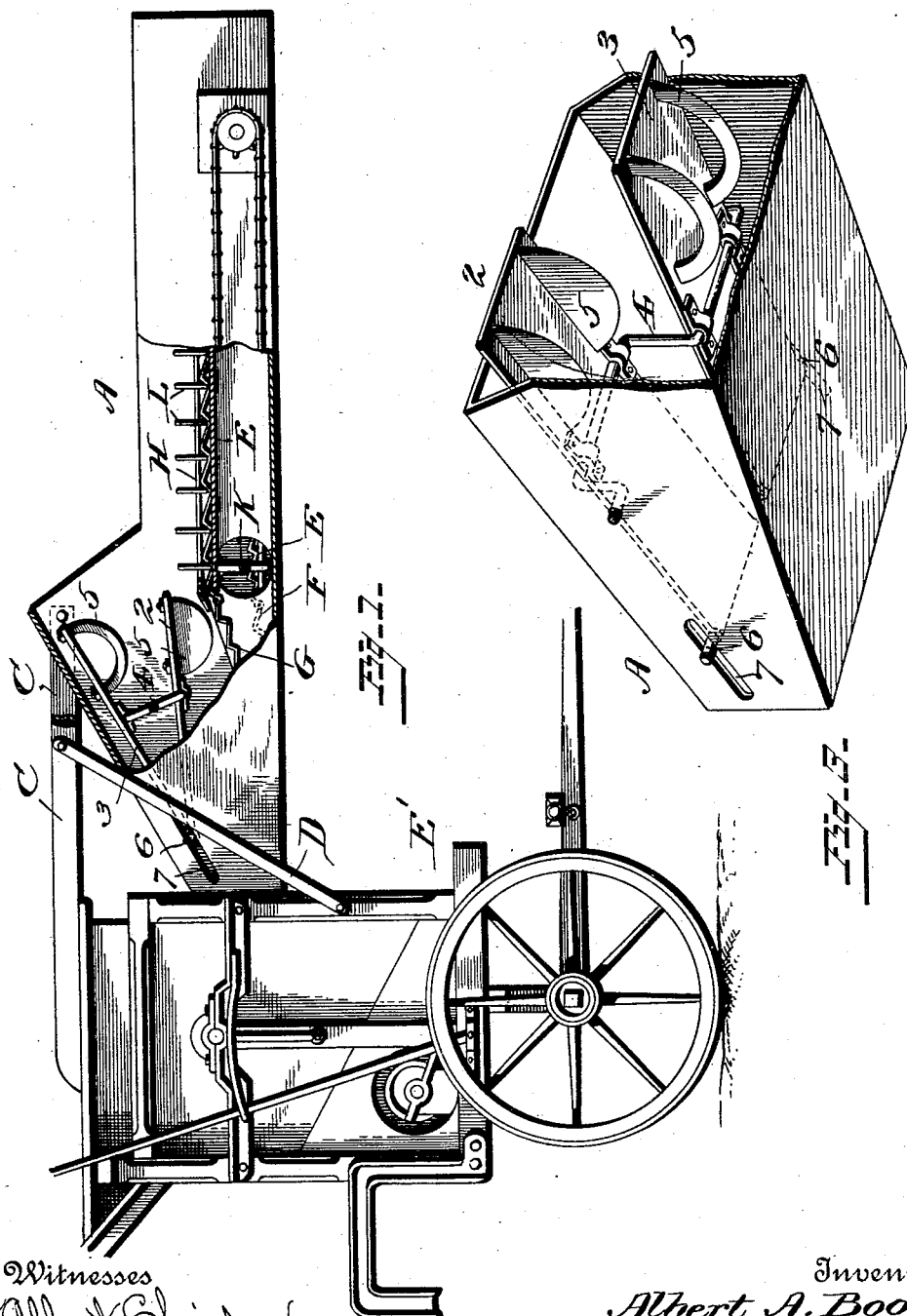
Witnesses
Albert Speiden
Lillie M. Hillyard
Inventor
Albert A. Booth.
By his Attorneys
R.S. & A.T. Lacey

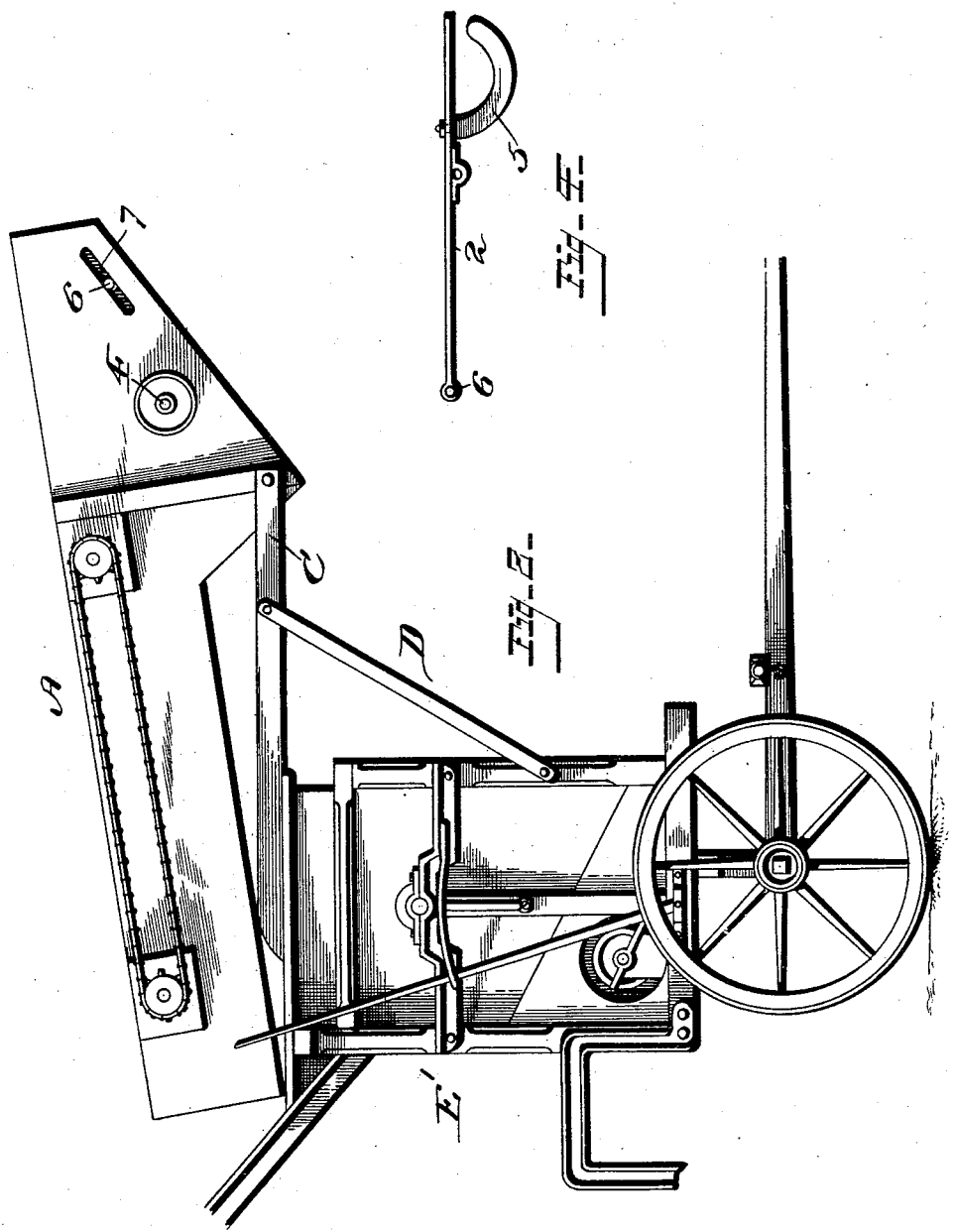

UNITED STATES PATENT OFFICE.

ALBERT A. BOOTH, OF ODELL, NORTH DAKOTA.

BAND-CUTTER AND FEEDER.

SPECIFICATION forming part of Letters Patent No. 469,907, dated March 1, 1892.

Application filed October 23, 1891. Serial No. 409,571. (No model.)

*To all whom it may concern:*

Be it known that I, ALBERT A. BOOTH, a citizen of the United States, residing at Odell, in the county of Barnes and State of North Dakota, have invented certain new and useful Improvements in Band-Cutters and Feeders; and I do hereby declare the following to be a full, clear, and exact description of the invention, such as will enable others skilled in the art to which it appertains to make and use the same.

This invention relates to band-cutters and feeders, and has for its object to provide a simple and efficient cutting mechanism for severing the bands which bind together the grain in bundles, and which will at the same time assist in feeding the grain to the thrashing-machine.

The improvement consists in the novel features and the peculiar construction and combination of the parts, which will be hereinafter more fully described and claimed, and which are shown in the annexed drawings, in which—

Figure 1 is a side view of a band-cutter and feeder, parts being broken away, showing the application of the same to a thrashing-machine of ordinary construction, the front portion of the said machine being shown simply to show the relative arrangement of the invention thereto. Fig. 2 is a view similar to Fig. 1, showing the band-cutter and feeder in its folded position. Fig. 3 is a detail perspective view of the delivery end of the feeder, showing the plates which carry the knives. Fig. 4 is a detail view showing a modified form of knife.

The invention in its application is designed to be used in connection with any ordinary feeding mechanism, but is especially designed for use in connection with the feeder shown in Patent No. 458,885, granted me September 1, 1891. The frame A is substantially the same as that shown in the patent above referred to, and the feeding mechanism supported by the said frame is identical with that shown in the said patent, comprising the slotted frame H, two separate and independently-operated carrier-tables E, having teeth L, which operate through the spaces between the slats of the frame H, and which are supported at their ends on compound crank-shafts K, and the wings F and G, which are hinged to the ends of the said carrier-tables E. The delivery end of the frame has its sides widened and closed by a sloping top and is pivotally supported between beams C, which are projected from the thrashing-machine E', in such a manner that it can be folded upon the thrashing-machine when moving the latter or housing it after performing service. The folded position of the feeder is shown in Fig. 2 of the drawings. The beams C are strengthened by the trussbrace D.

The cutting mechanism is composed of the plates 2 and 3, which are journaled midway of their ends on the crank portions of the crank-shaft 4, that is journaled at its ends in the sides of the frame A. The plates 2 and 3 are provided at their inner ends with knives 5, which curve to give a draw cut on the bands. The front or outer ends of the plates are provided with guide-arms 6, one for each plate, which extend through guide-slots 7 in the sides of the frame A and give proper direction to the said plates and knives in the efficient operation of the invention.

Having thus described my invention, what I claim, and desire to secure by Letters Patent, is—

1. In a band-cutter and feeder, the combination, with the frame provided with the feeding mechanism consisting of a carrier-table, means for actuating the said carrier-table, a wing hinged to the end of the said carrier-table, and a crank-shaft journaled in the said frame directly above the said wing, of a plate journaled midway of its ends on the said crank-shaft and provided with knives at its inner end, and a guide-arm carried by the other end of the said plate and working in a guide provided in the said frame to give proper direction to the said plate, substantially as set forth.

2. In a band-cutter and feeder, the combination, with the frame provided with the feeding mechanism consisting of two carrier-tables, wings hinged to the inner ends of the said tables, means for alternately actuating the said carrier-tables and wings, and a compound crank-shaft located directly above the said wings, of two plates, each mounted on a crank portion of the said shaft and adapted to have an alternate movement, knives at the inner ends of the said plates, and guides between the outer ends of the said plates and the sides of the frame, substantially as and for the purpose set forth.

3. The combination, with a thrashing-machine, the beams C, extended horizontally from the frame of the machine, and the truss-brace D, strengthening the outer ends of the beams C, of a frame provided with the band-cutting and feeding devices journaled between the outer ends of the beams C at a point between its ends and adapted either to rest in working position with its inner end against the thrasher-frame or to fold upon the said thrashing-machine, substantially as shown and described.

4. In a band-cutter and feeder, the combination, with the frame having alternately-operated feed-tables and having wings pivotally connected with the said tables, of a compound crank-shaft located above the wings, two plates, each mounted between its ends on the crank portions of the said crank-shaft and having knives at their inner ends, and guide-arms projected laterally from the outer ends of the said plates and working in guide-grooves in the sides of the frame to give proper direction to the said plates, substantially as and for the purpose specified.

In testimony whereof I affix my signature in presence of two witnesses.

ALBERT A. BOOTH.

Witnesses:
   HENRY MILLER,
   VERNON J. Y. SHAW.